Aug. 30, 1927.

B. WILLIAMS 1,640,388

STEERING GEAR

Filed Jan. 14, 1926

Inventor:
Byron Williams,
By Chindall Parker Paulson
Attys.

Patented Aug. 30, 1927.

1,640,388

UNITED STATES PATENT OFFICE.

BYRON WILLIAMS, OF CHICAGO, ILLINOIS.

STEERING GEAR.

Application filed January 14, 1926. Serial No. 81,235.

My invention relates to improvements in the steering gear of automobiles. In the steering mechanism of automobiles, particularly those of the reversible type, such as is used in the Ford car, it is necessary to maintain a firm grip on the steering wheel at all times, as the impact of the front wheels against any irregularity in the surface of the road tends to deflect the front wheels from a straight course. The strain of holding the front wheels from deviation due to these impacts is very tiring especially during a long trip.

The object of this invention is to provide means whereby the shock of the impact and the tendency of the front wheels to deviate is automatically resisted. This is accomplished by means of a plurality of springs attached to each steering arm which act to hold the front wheels in alinement with the rear wheels and to resist any force which tends to move them out of such alinement.

A complete disclosure of my invention will be found in the following specification and accompanying drawings, which show a preferred embodiment of my invention.

Figure 1:
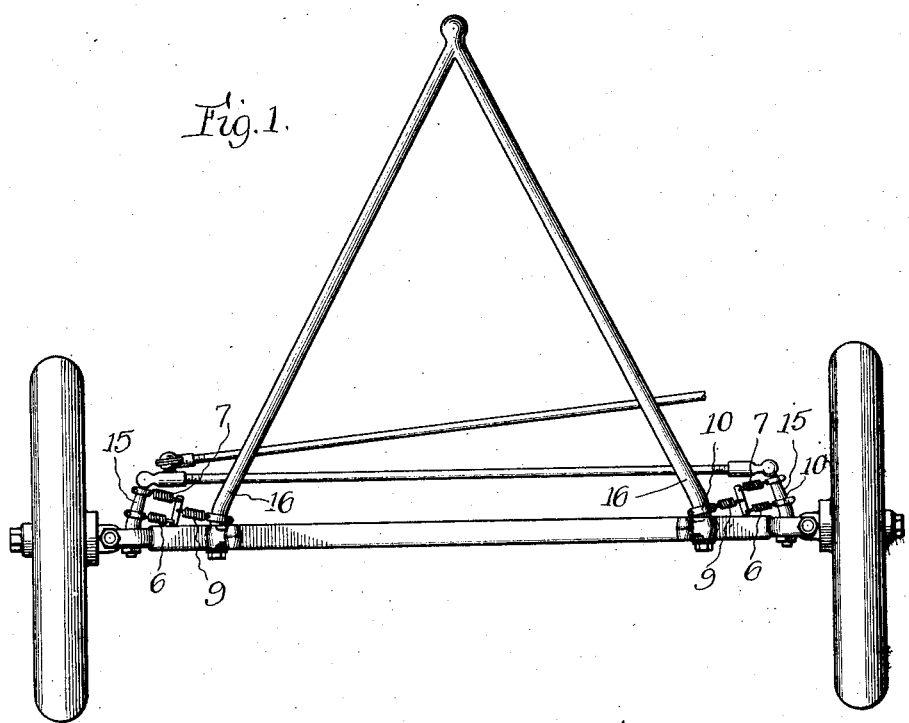
Figure 1 is a partial plan view of the steering mechanism of an automobile showing my steering gear installed.
Figure 2:
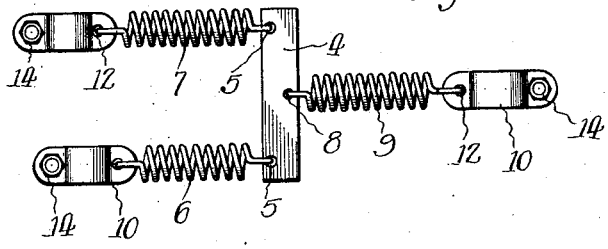
Fig. 2 is an enlarged plan view of my device.
Figure 3:
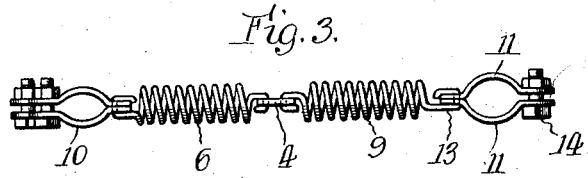
Fig. 3 is a side view of the same.

Referring to the drawings, my invention comprises an evener bar in the form of a flat rectangular metal plate 4 having holes 5 one at each end and adjacent the same edge of the plate 4. Into these holes 5 are hooked helical contractile springs 6 and 7, the spring 6 being shorter than the spring 7.

Midway between the holes 5 but adjacent the opposite edges of the rectangular plate 4 is another hole 8 having a third spring 9 hooked therein. This spring is substantially the same size as spring 7. The evener bar serves to equalize the tension among the three springs.

At the free end of each spring is a suitable fastening means for incorporating the device in the steering mechanism of the automobile. Preferably this means is a split-clamp 10 comprised of two metal plates having outwardly arcuately bent portions 11 between the ends. In one end of the clamp plates 10 is a hole 12 through which the spring is hooked as shown at 13. In the other end of the clamp plate 10 is a larger hole to receive a bolt 14 by means of which the clamp may be removably secured to a rod.

The split-clamp attached to the spring 9 is somewhat larger than those attached to springs 6 and 7 to allow for the differences in size of the steering mechanism members which are to be embraced by the split clamps. The spring 6 is shorter than the spring 7 to allow for the angular position of the steering arm 15 (Fig. 1) of the automobile.

To install the device in an automobile the two springs 6 and 7 are clamped to the steering arm 15 of the automobile. The third spring 9 is attached to the radius rod 16 immediately adjacent the front axle. A set of springs is installed on the steering arms and radius rods on both the right and left hand sides of the automobile. When in operation any impulse acting to turn the front wheels to the right is resisted by the springs on the left side of the automobile and conversely any impulse tending to force the wheels to the left is resisted by the springs on the right side.

I claim as my invention:

In combination with a motor vehicle chassis having two steering arms, two devices each acting on one of said steering arms to resist an outward movement of said steering arms from said chassis, each of said devices comprising an evener bar, two springs attached one near each end of said evener bar and extending in the same direction therefrom, means for attaching said springs to one of said steering arms, a third spring attached to said evener bar intermediate said first two springs but extending from said evener bar in the opposite direction from said first two springs, and means for securing said third spring to the chassis.

In testimony whereof, I have hereunto affixed my signature.

BYRON WILLIAMS.